(12) United States Patent
Mouti et al.

(10) Patent No.: US 12,718,400 B2
(45) Date of Patent: Aug. 25, 2026

(54) BLADE POSITIONING AND IDENTIFICATION SYSTEM FOR ENGINE INSPECTION

(71) Applicant: Rhinestahl CTS, Mason, OH (US)

(72) Inventors: Hicham Mouti, West Chester, OH (US); Mark Marasch, Mason, OH (US); Art Alaiza, Mason, OH (US)

(73) Assignee: RHINESTAHL CORPORATION, Mason, OH (US)

( * ) Notice: Subject to any disclaimer, the term of this patent is extended or adjusted under 35 U.S.C. 154(b) by 648 days.

(21) Appl. No.: 17/983,811

(22) Filed: Nov. 9, 2022

(65) Prior Publication Data

US 2023/0177721 A1 Jun. 8, 2023

Related U.S. Application Data

(60) Provisional application No. 63/277,730, filed on Nov. 10, 2021.

(51) Int. Cl.
*G06T 7/73* (2017.01)
*G06T 7/254* (2017.01)
(Continued)

(52) U.S. Cl.
CPC ................ *G06T 7/74* (2017.01); *G06T 7/254* (2017.01); *G06T 7/269* (2017.01); *G06V 10/764* (2022.01);
(Continued)

(58) Field of Classification Search
CPC ........... G06T 7/74; G06T 7/254; G06T 7/269; G06T 7/001; G06T 2207/30164;
(Continued)

(56) References Cited

U.S. PATENT DOCUMENTS 8,744,166 B2 6/2014 Scheid et al.
8,761,490 B2 6/2014 Scheid et al.
(Continued)

OTHER PUBLICATIONS

CN-113714133-A ; Machine English translation w/ original doc (Year: 2021).*

(Continued)

*Primary Examiner* — Vu Le
(74) *Attorney, Agent, or Firm* — Taft Stettinius & Hollister LLP

(57) ABSTRACT

A method for identifying a plurality of blades of an engine. The method can include obtaining and recording a reference view captured by a vision system of an initial, or first, blade of a plurality of blades of the engine at a first blade position, such as an inspection position. The positions of other blades that are to be subsequently identified and/or cataloged can be evaluated by a controller from information captured by the vision system and the reference view to determine if the subsequent blade is at the first blade position. If a blade is determined to not be at the first blade position, the controller can generate an error signal indicative of an amount an actuator is to be operated to displace the blade to the first blade position. The controller can compare information captured from the image of a blade with stored data to identify the blade.

19 Claims, 5 Drawing Sheets

(51) Int. Cl.
*G06T 7/269* (2017.01)
*G06V 10/764* (2022.01)

(52) U.S. Cl.
CPC ............... *G06T 2207/20081* (2013.01); *G06T 2207/20084* (2013.01)

(58) Field of Classification Search
CPC ........... G06T 2207/20081; G06T 2207/20084; G06V 10/44; G06V 10/764; G06V 20/52; G06V 10/82
See application file for complete search history.

(56) References Cited

U.S. PATENT DOCUMENTS

| | | | | |
|---|---|---|---|---|
| 8,791,998 | B2 | 7/2014 | Hori | |
| 8,792,705 | B2 | 7/2014 | Scheid et al. | |
| 9,950,815 | B2 | 4/2018 | Finn et al. | |
| 10,191,479 | B2 | 1/2019 | Lim et al. | |
| 10,504,218 | B2 | 12/2019 | Finn et al. | |
| 10,914,191 | B2 | 2/2021 | Finn et al. | |
| 2008/0247635 | A1* | 10/2008 | Davis | G06T 19/00 382/152 |
| 2012/0200087 | A1 | 8/2012 | Schindele et al. | |
| 2013/0307961 | A1* | 11/2013 | Puigcorbe | F03D 17/00 348/82 |
| 2014/0046614 | A1 | 2/2014 | Pettersson | |
| 2014/0167415 | A1 | 6/2014 | Mykhaylyshyn | |
| 2015/0092039 | A1 | 4/2015 | Ruhge et al. | |
| 2015/0132130 | A1 | 5/2015 | Brown | |
| 2017/0075326 | A1* | 3/2017 | Britt | G05B 19/042 |
| 2017/0169400 | A1* | 6/2017 | Diwinsky | G06F 18/24 |
| 2017/0260968 | A1 | 9/2017 | Tsutsui et al. | |
| 2017/0344029 | A1* | 11/2017 | Hashimoto | G05B 19/416 |
| 2018/0336674 | A1 | 11/2018 | Lim et al. | |
| 2019/0032508 | A1 | 1/2019 | Wang et al. | |
| 2019/0228514 | A1* | 7/2019 | Hestand | G06T 7/62 |
| 2019/0304077 | A1* | 10/2019 | Wang | G06V 20/46 |
| 2019/0338666 | A1* | 11/2019 | Finn | G06T 3/4038 |
| 2019/0339165 | A1* | 11/2019 | Finn | G01N 21/9515 |
| 2020/0175669 | A1* | 6/2020 | Bian | G06T 7/0004 |
| 2021/0262988 | A1* | 8/2021 | Balkowski | G01M 7/08 |
| 2022/0076407 | A1* | 3/2022 | Nayeri | G06T 7/0004 |

OTHER PUBLICATIONS

International Search Report & Written Opinion issued in corresponding PCT/US2022/049399 on Feb. 9, 2023 (15 pages).

* cited by examiner

BLADE POSITIONING AND IDENTIFICATION SYSTEM FOR ENGINE INSPECTION

CROSS REFERENCE TO RELATED APPLICATIONS

The present application claims the benefit of U.S. Provisional Patent Application Ser. No. 63/277,730, filed Nov. 10, 2021, which is incorporated herein by reference in its entirety.

BACKGROUND

Embodiments of the present disclosure generally relate to inspection systems, and more particularly, but not exclusively, relate to positioning systems utilized in connection with positioning and cataloging items for inspection.

Inspection of turbine engines can include inspection of the blades and associated shaft, among other components of the turbine. Such inspection, including inspection that is performed using a borescope, can involve coupling the turbine shaft to a turning tool, which may, or may not, be part of the borescope. The turning tool can include a motor that can be indirectly coupled to the turbine shaft, and which provides a force that allows an inspector or operator to selectively turn or rotate the turbine shaft. For example, the operator can selectively activate and deactivate operation of the motor of the turning tool such that the turbine shaft can be turned to a limited extent so as to allow the operator to index from one turbine blade to the next as the operator progresses through an inspection of the turbine blades.

Such turning systems however suffer from a number of deficiencies. For example, with respect to certain systems, movement of blades to a select position can be based on the system moving the shaft by a set amount, which can be based, for example, on a gear ratio of a gearbox of, or coupled to, the engine. Such systems however may lack an accurate indication of the actual position of the shaft. Further, the gear train of the gearbox may be worn, or have other issues, that can adversely impact the accuracy in selectively moving and/or positioning the shaft and associated blades. Further, if such positional inaccuracies are not detected by an inspector until after the inspection, the inspection may have to be repeated, thereby causing a waste in time and resources.

Additionally, backlash in the gearing of a gearbox of the turbine or other transmission components, and/or at an interface between the tuning tool and the engine, can also complicate the ability of an operator or turning system to determine when to deactivate operation of the motor. With respect to at least some automated systems, initial detection of backlash relies at least in part on an operator detecting, following activation of the motor, multiple movements of an engine shaft or an associated blade(s). Moreover, some systems rely on a backlash measurement that utilizes a location at which the operator first detects turbine shaft movement when the motor operates to rotate the turbine shaft in a first direction, and another turbine shaft movement detection by the operator when the motor operates to rotate the turbine shaft in an opposite, second direction. Yet, such systems can be hindered by a delayed reaction time of the operator in not only visually recognizing the occurrence of such movements, but also providing timely responses to indicate when each of such movements have been detected. Additionally, the degree of backlash of such turbine gearboxes is not necessarily consistent, and the extent of backlash can change relative to the position of gears of the turbine gearbox.

Accordingly, there remains a need for further contributions in this area of technology.

BRIEF SUMMARY

An aspect of the present disclosure is a method for identifying a plurality of blades of an engine. The method can include recording a reference view captured by a vision system of a first blade of the plurality of blades at a first blade position, and comparing, by a controller after displacement of the first blade from the first blade position, information from a view captured by the vision system of another blade of the plurality of blades to information from the reference view. Further, the controller can determine from the compared information, if the other blade is at the first blade position. If the other blade is determined to not be at the first blade position, the controller can generate an error signal indicative of an amount an actuator is to be operated to displace the other blade to the first blade position.

Another aspect of the present disclosure is a method for identifying a plurality of blades of an engine that can include generating, by a controller, a command to rotate a shaft of the engine to position a blade of the plurality of blades at a blade position that corresponds to a reference position at which a reference blade image had previously been captured. The controller can further use one or more images captured by a vision system to identify at least one classifier of the blade. The at least one classifier can correspond to one or more intentional and/or unintentional physical features of the blade that is/are detected by the controller from the one or more images. The at least one classifier can be compared with stored data for the plurality of blades, and, from an outcome of the comparison, a stored identifier for the blade can be identified. Further, the method can be repeated until each blade of the plurality of blades is identified.

BRIEF DESCRIPTION OF THE DRAWINGS

The description herein makes reference to the accompanying figures wherein like reference numerals refer to like parts throughout the several views.

Figure 1:
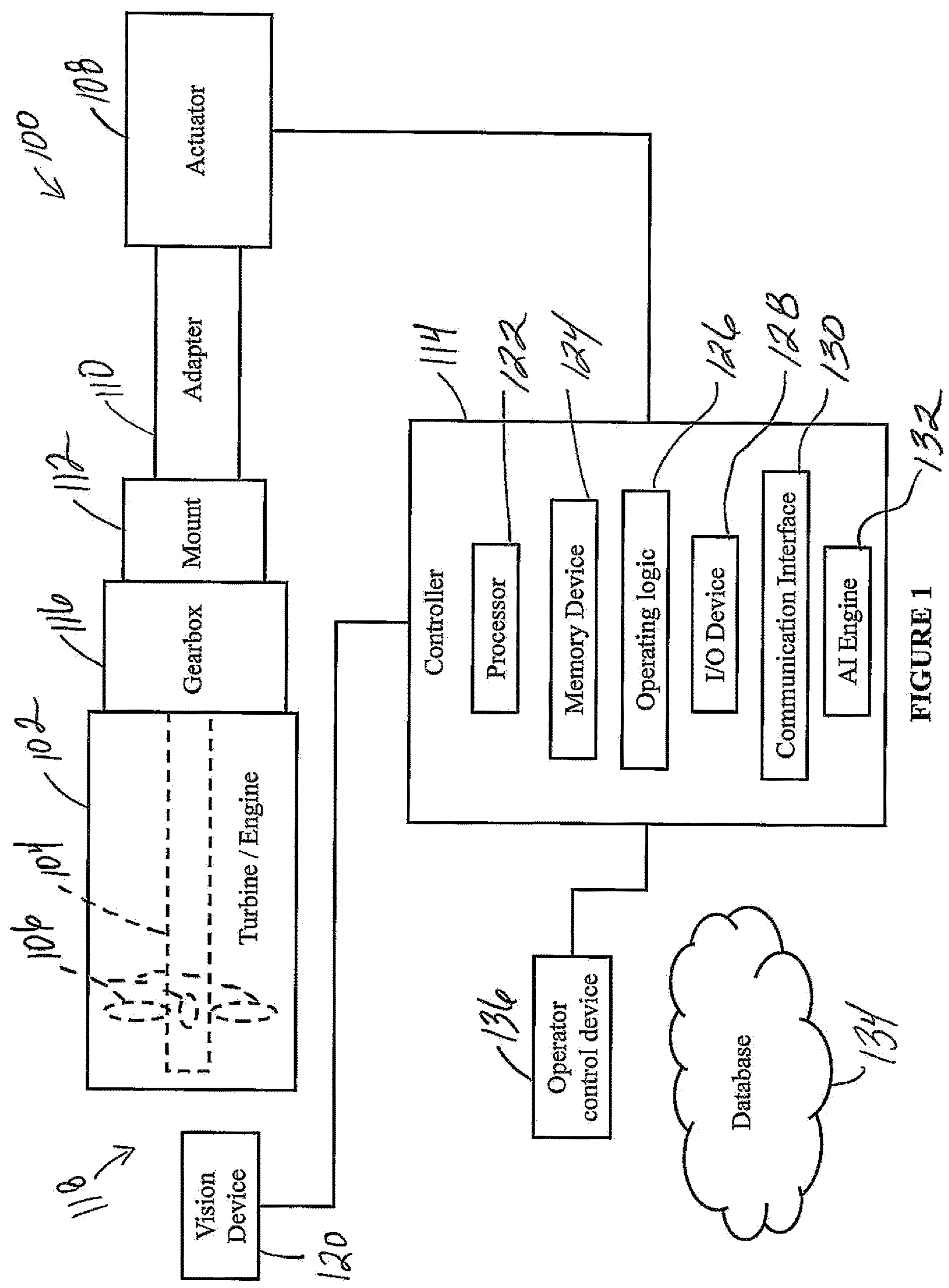
FIG. 1 illustrates a block diagram of an exemplary positioning system according to an illustrated embodiment of the subject application.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

As set forth herein with respect to the various embodiments, a positioning system can be configured to capture one or more images of a blade of an engine, such as, for example, a gas turbine engine or generator, via a camera of a vision system, whereupon a controller is structured to perform an action based upon the image(s). Such action can include a closed loop error feedback to determine if the blade is in a preferred position, such as, for example, an inspection position, and if not, then to operate an actuator of the positioning system to move the blade to eliminate and/or decrease the error feedback. The closed loop error can be based upon image comparison between a preferred image orientation of the blade and the current image orientation of the blade.

Various approaches to determine and/or synthesize a position error are contemplated herein. For example, the controller of the positioning system can operate on the basis of a direct comparison of images (e.g. a comparison of an image from a desired blade position with a current image from the blade), or indirect comparisons such as through use of position information synthesized from the image. A direct comparison of images can be performed using any variety of techniques such as locality-sensitive hashing, mean squared error, or structural similarity index, to set forth just a few non-limiting examples. The direct comparison of images can produce any variety of output useful in determining whether the blade is in an adequate position, including, for example, at an inspection position, to obtain the inspection imagine. For example, the output produced by a direct comparison can be a binary (e.g. produced through a classifier), or it can be numerical value such as, but not limited to, a probability measure. The controller of the positioning system can be configured to activate the actuator depending on the state of the binary or the numerical value satisfying a threshold, and conversely cease excitation of the actuator if the binary provides a contra-indication or the numerical value fails to satisfy the threshold.

Indirect comparison of images can be performed where the controller determines a position output (e.g. angular position of the shaft) based on the image, and thereafter regulates position from the determined position output. Such determination of position output can be through a calibration table or the like, a data-driven model such as a neural network (e.g. formed using a Convolutional Neural Network), etc. Whether the control feedback is performed using direct image comparisons or through indirect image comparisons, it will be appreciated that a current image of the blade will provide a position indication useful in the controller.

Depending on the embodiment, the position indication alone, or the position indication in conjunction with a desired position can be used as basis for commanding the actuator to move the blade, as will be understood from the description below. For example, in those situations where the position indicator is a binary representation that indicates whether the blade is, or is not, in proper position, the position indicator alone can be used to drive the actuator. Driving the actuator based upon a binary position indicator can be accomplished using techniques discussed below, including, but not limited to, associated with ON/OFF type controllers (e.g. driving the actuator in either an ON condition or an OFF condition), among other techniques.

In other situations, the position indication and resultant error signal from the desired position is used to energize the actuator and move the shaft of the engine. The error signal based on the position indication can be used in a discrete manner to operate the actuator, including, for example, in an ON/OFF state such as used in a bang-bang controller, or in a position error output manner, whether the position indication is a relative position output or absolute position output. As will be appreciated, in the ON/OFF type of bang-bang controller embodiments, any error signal outside of a threshold can be used to trigger the actuator. Such actuation can operate the actuator between two states, for example between a state which uses a constant power, or a constant speed, etc. until the error is eliminated and/or within a desired threshold, and a state in which the actuator no longer produces power/speed/etc.

In those embodiments in which position output is used, the controller can be configured to drive the actuator where the power/speed/etc. of the actuator can be dependent upon the magnitude of the position error. Any variety of actuator shaping can be used to define the envelope of acceptable actuator power/speed/etc. to the command. For example, the controller can impose a maximum and/or minimum rate limit to which the actuator can be driven. Such rate limit can be set equal to any hardware resultant limits, but other embodiments may use software imposed limits within the hardware limitations. Any variety of input-to-output shapes can be imposed between a minimum and maximum output, whether such shapes are linear, piecewise linear, non-linear, or any combination thereof.

As will be appreciated, the controller can in some embodiments be implemented as a proportional-integral-derivative controller, a proportional-integral controller, or a proportional controller, to set forth just a few non-limiting examples. However, other control schemes are also contemplated.

FIG. 1 illustrates a block diagram of an exemplary positioning system 100 according to an illustrated embodiment of the subject application. The positioning system 100 is adapted to position one or more components or work piece of an engine 102, including, for example, a shaft 104 and one or more of a plurality of turbine and compressor blades 106 that are coupled to the shaft 104. The positioning system may, or may not, be integrated into the borescope. Thus, while the positioning system 100 can provide information useful for subsequent inspection of the engine 102 that is performed using a borescope, such as, for example, inspection of the condition of blades 106 of the engine 102, according to certain embodiments the positioning system 100 and the borescope can be separate systems.

The positioning system 100 can be used with a variety of different types of engines 102, including, but not limited to, gas turbine engines and/or generators, among other types of engines. The positioning system 100 can also be used in connection with various work pieces and/or components of the engine 102. For ease of convenience, reference will be made below to a shaft 104 of the engine 102 as a component or work piece of the engine 102 that can be caused to be moved by the positioning system 100. However, no limitation is intended herein that such component and/or work piece must necessarily be limited to a shaft 104 of the engine 102 and/or the engine 102 itself. Moreover, other components and/or work pieces of the engine 102 are also envisioned.

The positioning system 100 can include an actuator 108 that is coupled, via an adapter 110, to the engine 102. For example, the adapter 110 can be coupled to an accessory and/or auxiliary mount, collectively referred to as an engine mount 112, of the engine 102. The actuator 108 contemplated herein is any actuator suitable to manipulate a desired work piece. As used herein, therefore, the term "actuator" can refer to a variety of devices whether electric, mechanical, hydraulic, pneumatic, and electro-mechanical, among other actuators suitable to manipulate an object. The actuator 108 can produce linear or rotational motion through any suitable end effector. In some forms the actuator 108 can include more than one actuation system that in concert work to manipulate the work piece and/or component of the work piece. In other additional and/or alternative forms, the actuator 108 can be coupled to the work piece and/or component of the work piece through an adapter 110. Examples of the actuator 108 include, but are not limited to, a motor, reducer, and encoder, among other actuators.

The actuator 108 can provide a force to directly or indirectly cause motion in at least a portion of the engine 102 for at least turning purposes, among other inspection purposes. Moreover, the actuator 108 can provide a force that is used to cause the shaft 104, to which the turbine blades 106 are attached, to be rotated. With respect to at least engines 102 that are turbine gas engines, such turning of the shaft 104 can also be used to cause blades 106 of different stages of the engine 102 to be rotated. Additionally, according to certain embodiments, a bi-directional data signal can be communicated between the actuator 108 and a controller 114 (e.g. actuator 108 position feedback to the controller 114). However, in some forms, such signals can be in a single direction from the controller 114 to the actuator 108 such that the actuator loop can be closed locally at the actuator 108.

The engine mount 112 can include, or be coupled to, a gearbox 116 of the engine 102, which can include plurality of gears, among other transmission components. Alternatively, according to other embodiments, the engine mount 112 can comprise a radial drive shaft port, or can comprise an interface of the shaft 104 that can accommodate direct coupling of the actuator 108 to the shaft 104. Alternatively, according to other embodiments, the engine mount 112 can provide an interface directly between at least some of the blades 106 and the actuator 108. One non-limiting example of such a mount 112 is at the starter or auxiliary gearbox location of the engine 102, such as, for example, a starter box of a gas turbine engine. For at least inspection purposes, such a starter can be removed and the engine mount 112 can be installed in its place to manipulate the shaft 104 of the engine 102.

According to certain embodiments, manipulation of the shaft 104 can be accomplished through a gear train of a gearbox 116 that can include any variety of idler gears and/or pinions, among other gearing and transmission components. As discussed below, in some forms knowledge of the gear ratio of the gear train can be utilized by the controller 114 when driving the shaft 104. As will be appreciated, any indirect connection between the actuator 108 and the shaft 104 such as through a gear train can introduce nonlinearities including, but not limited to, gear lash and/or hysteresis. Embodiments described further herein contemplate the presence of such nonlinearities when operating the positioning system 100.

The positioning system 100 can also include a vision system 118 having, for example, a camera 120 or other vision device that can capture an image(s), including, but not limited to, still images, a collection of still images, and/or video. The camera 120 can refer to any suitable device capable of capturing electromagnetic information, whether or not in the visible light spectrum. As used herein the term "camera" can refer to a variety of devices capable of detecting electromagnetic radiation, such as but not limited to visible light, light in the infrared range, light in the near-infrared range, etc. Such "cameras" can also refer to 2D and/or 3D cameras. The camera 120 can also include any number of lenses and/or focal paths, among other optical characteristics and features. Further, the camera 120 can be configured to capture one or more images of at least a portion of the engine 102, including, for example, an image(s) of the rotatable shaft 104 and/or one or more blades 106 of the plurality of compressor blades 106.

According to certain embodiments, the camera 120 can be, can be coupled to, or can be part of, a borescope that can include a rigid and/or flexible member that is useful to reach into restricted spaces. As will be appreciated, use of borescopes can, for example, provide views from different positions, angles, lighting conditions, and/or fields of view. Additionally, according to certain embodiments, the positioning system 100 can include a single camera 120, while, for other embodiments, the positioning system 100 can include a plurality of cameras 120 wherein one or more of the cameras 120 may, or may not, be a different type of camera 120 than at least one other camera 120. For example, according to certain embodiments, the vision system 118 can include a first camera 120 capable of imaging in the visible light spectrum, and a second camera 120 for imaging in the near-infrared. Accordingly, any reference herein to "camera" in the singular is not intended to be limited to a single camera unless explicitly stated to the contrary.

The positioning system 100 can further include one or more controllers 114 that can be adapted to regulate the process(es) by which the actuator 108 causes motion of at least the portion of the gas turbine engine 102, and/or which can be utilized to operate and analyze information captured via the vision system 118, and moreover via the camera 120. Moreover, the controller 114, including, for example, an image and/or data driven controller or a combination thereof, can be provided to monitor and control the actuator 108 based upon images obtained from the vision system 118 and/or the camera 120. Such images can, for example, be either raw camera images or images which are the product of raw images, such as images that have been processed using any variety of techniques including but not limited to color models such as RGB, HSL, or HSV as will be understood by those of skill in the art. Further, according to certain embodiments, the controller 114 can be hosted by a computer. The controller 114, and/or the computer, includes one or more processing device(s) 122, memory device(s) 124, operating logic 126, and an input/output device 128.

Furthermore, the controller 114 and/or the computer can communicate with one or more external devices.

The controller 114 can be comprised of digital circuitry, analog circuitry, or a hybrid combination of both of these types. Also, the controller 114 can be programmable, an integrated state machine, or a hybrid combination thereof. The controller 114 can include one or more Arithmetic Logic Units (ALUs), Central Processing Units (CPUs), Graphics Processing Units (GPUs), memories, limiters, conditioners, filters, format converters, or the like which are not shown to preserve clarity. In one form, the controller 114 is of a programmable variety that executes algorithms and processes data in accordance with operating logic that is defined by programming instructions (such as software or firmware). Alternatively or additionally, operating logic for the controller 114 can be at least partially defined by hardwired logic or other hardware. It should be appreciated that controller 114 can be exclusively dedicated to operation of the actuator 108 based upon images from the camera 120, or may further be used in the analysis of images described in embodiments further below.

The processing device 122 can be of a programmable type, a dedicated, hardwired state machine, or a combination of these; and can further include multiple processors, Arithmetic-Logic Units (ALUs), Central Processing Units (CPUs), Graphics Processing Units (GPUs), or the like. For forms of the processing device 122 with multiple processing units, distributed, pipelined, and/or parallel processing can be utilized as appropriate. The processing device 122 can be dedicated to performance of just the operations described herein or may be utilized in one or more additional applications. In the depicted form, the processing device 122 is of a programmable variety that executes algorithms and processes data in accordance with operating logic 126 as defined by programming instructions (such as software or firmware) stored in the memory device 124. Alternatively or additionally, the operating logic 126 for the processing device 122 is at least partially defined by hardwired logic or other hardware. The processing device 122 can be comprised of one or more components of any type suitable to process the signals received from the input/output device 128 or elsewhere, and provide desired output signals. Such components may include, but are not limited to digital circuitry, analog circuitry, and quantum computing.

The memory device 124 can be of one or more types, such as a solid-state variety, electromagnetic variety, optical variety, quantum variety, or a combination of these forms. Furthermore, the memory device 124 can be volatile, nonvolatile, or a mixture of these types, and some or all of the memory device 124 can be of a portable variety, such as a disk, tape, memory stick, cartridge, or the like. In addition, the memory device 124 can store data that is manipulated by the operating logic 126 of the processing device 122, such as data representative of signals received from and/or sent to input/output device 128 in addition to or in lieu of storing programming instructions defining the operating logic 126, just to name one example.

The communication interface 130 can be any type of device that allows the controller 114 and/or the computer to communicate with the external device. For example, the communication interface 130 can be a network adapter, network card, or a port (e.g., a USB port, serial port, parallel port, VGA, DVI, HDMI, FireWire, CAT 5, or any other type of port). Further, the communication interface 130 can be configured for wired and/or wireless communications including, for example, via proprietary and/or non-proprietary wireless communication protocols. For example, the input/output device 128 can be configured to accommodate communications Wi-Fi, ZigBee, Bluetooth, radio, cellular, or near-field communications, among other communications that use other communication protocols. Additionally, or alternatively, according to certain embodiments, the communication interface 130 can comprise a transceiver. Further, the communication interface 130 can be comprised of hardware, software, and/or firmware. It is contemplated that the communication interface 130 includes more than one of these adapters, cards, or ports.

The input/output (I/O) device 128 can be any type of device that allows data, instructions, and or information to be inputted and/or outputted from the controller 114 and/or the computer. To set forth just a few non-limiting examples, the input/output device 128 can be another server, a printer, a display, an alarm, an illuminated indicator, keyboard, mouse, mouse button, and/or a touch screen display, among other forms of input/output devices. In some forms there may be more than one input/output device 128 in communication with the controller 114 and/or the computer. Further, it is contemplated that the input/output device 128 may be integrated into the controller 114 and/or the computer. In such forms the computer can include different configurations of computers used within it, including one or more computers that communicate with one or more input/output device 128, while one or more other computers are integrated with the input/output device 128.

The controller 114 can also include, or otherwise be communicatively coupled to, an artificial intelligence (AI) engine or neural network 132. While the depicted embodiment illustrates the AI engine 132 being part of the controller 114, according to other embodiments, the AI engine 132 can be cloud based. According to certain embodiments, the AI engine is a neural network 132, such as, but not limited to, a deep learning system that can be trained on a dataset of blade images, which can result in a data-driven controller 114. Moreover, the neural network or AI engine 132 can utilize recorded and/or stored information to improve the accuracy in the system 100 identifying positioning, features, and/or characteristics of blades 106 of the engines 102 and/or in connection with predicting wear related information pertaining to such blades 106. Further, over time, as data relating to blades 106, including the progression of certain defects, damage, or other wear characteristics, as well as blade 106 repair and/or replacement information, is accumulated, including by the memory device 124 or another database 134, the AI engine 132 can further refine the effectiveness and/or accuracy in the operation of the positioning system 100. Such improvement in the efficiency of at least the positioning system 100 can include refining the identification and/or predictions made by the AI engine 132 regarding the blades 106 of the engine 102.

The dataset of blade images used for training the AI engine 132 can be derived from any number of different sources, either separately or collectively. One source of images useful for training are field-generated images of actual blades 106 that are installed in an engine 102, such as, for example, a gas turbine engine. In those embodiments employing a vision system 118, which can include, for example, a borescope for inspection, images can be collected in the field (e.g., repair facility, manufacturing plant, testing center, etc.) from a variety of different positions, angles, lighting conditions, fields of view, etc. The images obtained by the vision system 118 can be used to train the data-driven controller 114 to recognize the blade 106 and/or blade type and/or blade position which may depend on the labels provided during the training. Additionally and/or alternatively, the data-driven controller 114 and/or AI engine 132 can be trained to recognize different types of blades. For example, the data-driven controller 114 and/or AI engine 132 can be configured to recognize a blade type from a particular stage of a particular engine 102, while in other forms the data-driven controller 114 and/or AI engine 132 can be configured to recognize blade types from different stages of the engine 102, or blades from an altogether different engine 102.

The data-driven controller 114 and/or AI engine 132 can alternatively and/or additionally be trained using models provided from a computer-aided design (CAD) system. Such synthesized images can be generated at a variety of angles, positions, lighting conditions, etc. to mimic real life conditions anticipated to be experienced in a physical inspection. The images can be used to train the data-driven controller 114 and/or AI engine 132 to recognize the blade 106 and/or blade type and/or blade position which may depend on the labels provided during the training. Additionally and/or alternatively, the data-driven controller 114 and/or AI engine 132 can be trained to recognize different types of blades 106. For example, the data-driven controller 114 and/or AI engine 132 can be configured to recognize a blade type from a particular stage of a particular gas turbine engine, while in other forms the data-driven controller 114 and/or AI engine 132 can be configured to recognize blade types from different stages of the gas turbine engine, or blades form an altogether different engine 102.

Whether the algorithm or model used by the controller 114 and/or AI engine 132 is trained based on real-world images or computer created images, the data-driven controller 114 and/or AI engine 132 can be configured to output a binary representing whether the blade 106 has been moved into the correct position, or can be configured to output a blade position (relative or absolute), among other contemplated outputs.

In the data-driven controller 114 and/or AI engine 132 embodiment described above, the positioning system 100 can, for example, be configured to operate according to the following:

- an operator selects a blade 106 and blade position as the starting blade and blade position for inspection;
- the positioning system 100 denotes the selection of a blade 106 and blade position for subsequent regulation of the actuator 108;
- an image is captured via operation of the vision system 118 of the blade 106 and blade position selected as the starting blade 106 and blade position;
- after acquisition of image of the starting blade 106 and blade position, the controller 114 activates the actuator 108 to move the shaft 104 and rotate into view a subsequent blade 106;
- the controller 114 and/or AI engine 132 monitors an image from the vision system 118 as a new blade 106 is rotated into position, comparing the image of the initial blade position against a current image;
- the controller 114 either deactivates the actuator to cease moving the shaft 104 when the current image presents a blade position that satisfies a condition in the controller 114 and/or AI engine 132, or the controller 114 and/or AI engine 132 records the image at the blade position that satisfies the condition while continuing to rotate the shaft 104; and
- move the shaft 104 and rotate into view another subsequent blade 106 until all blades 106 of the shaft 104 have had an image captured at the desired position.

According to certain embodiments, the accumulated, or inputted, data or information can be used by the AI engine 132 in connection with training and/or for machine based learning of the AI engine 132. For example, historical information regarding past wear characteristics, the advancement of such wear over time, and the timing of when such wear characteristics are to be addressed via either repair or replacement, among other information, can be used by the AI engine 132 in connection with a pattern analysis, as well as refinement of identified patterns. Such analysis can assist the AI engine 132 in developing and/or refining a model(s) that can provide a prediction of blade wear progression based on damage type, location, and/or size, as well as predictions relating to the repair for such wear and/or blade replacement timing. According to certain embodiments, the AI engine 132 can apply such data and information, among other information and data, to one or more models, and, moreover, one or more neural network algorithms, such as, but not limited to, a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

The positioning system 100 can also include an operator control device or interface 136 that can accommodate operator control of operation of at least certain aspects of the positioning system 100. According to certain embodiments, the operator control device 136 can be utilized to control aspects of operation of the positioning system 100, including any manual interactions described herein. Such operator control devices 136 can include, but are not limited to, a hand control unit, hand switch, and/or a foot switch, among others. The operator control device 136 can be configured for wired and/or wireless communication with the controller 114 and/or computer, and thus can be moveable independent of the positioning and/or movement of the controller 114 and/or computer. According to certain embodiments, the operator control device 136 can be utilized by the operator to facilitate operation and/or or deactivation of operation of the actuator 108, the camera 120 capturing an image(s) of the work component(s) of the engine 102, and/or inputting of information scanned, sensed, detected and/or inputted (among other manual interactions described herein) by the operator regarding the engine 102 and/or an associated work component(s) of the engine 102.

The positioning system 100 can also include a database 134 that can be accessible to the controller 114, including for example, but not limited to, via the communication interface 130. The database 134 can, according to certain embodiments, be a cloud based database. According to certain embodiments, interface with the database 134 can originate from the controller 114 and/or the I/O device 128. The positioning system 100 can provide information to the database 134, including, for example, information obtained via operation of the positioning system 100 and/or information inputted by the operator, including, but not limited to, information identifying, cataloging, and/or numbering blades 106 of the engine 102. Additionally, the database 134 can be used to retrieve information relating to prior inspections of the engine 102, including, for example, information indicating prior blade numbering, ratios of the gear train and/or gearbox 116, and/or information regarding the engine 102 being inspected, among other information.

Figure 2:
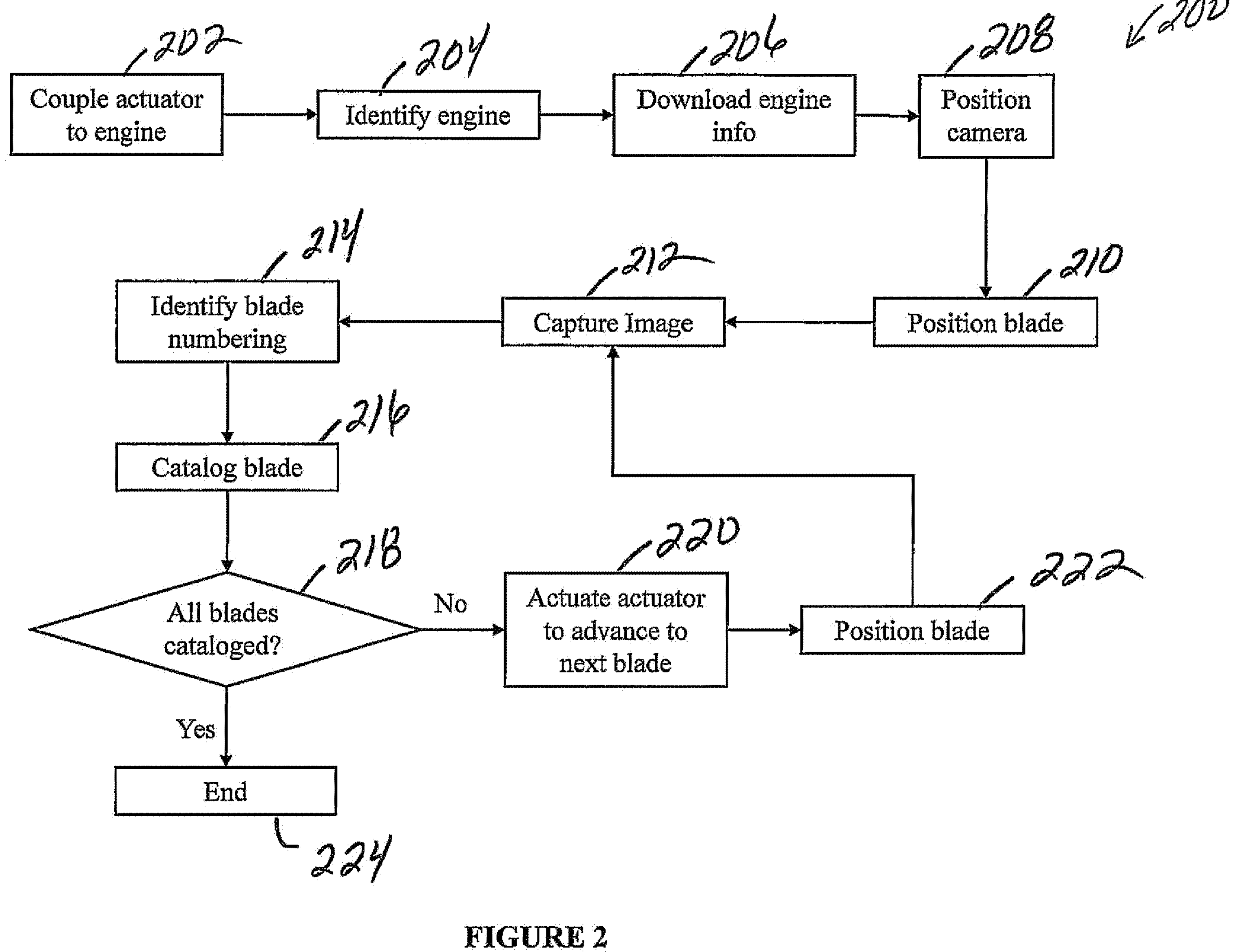
FIG. 2 illustrates a simplified flow chart of a method that can be performed using the positioning system shown in FIG. 1 for at least an initial inspection of an engine.

FIG. 2 illustrates a simplified flow chart of a method 200 that can be performed using the positioning system 100 shown in FIG. 1 for at least an initial inspection of the engine 102. The method 200 corresponds to, or is otherwise associated with, performance of the blocks described below in the illustrative sequence of FIG. 2. It should be appreciated, however, that the method 200 can be performed in one or more sequences different from the illustrative sequence.

At block 202, the actuator 108 can be coupled to the engine 102. For example, as previously discussed, the actuator 108 can be coupled to a mount 112 of the engine 102 via an adapter 110, which may, or may not, be specific for the engine 102 that is being inspected.

At block 204, the engine 102 can be identified, and information regarding the identified engine 102 can be downloaded or otherwise obtained at block 206. The process of obtaining such information can be performed in a number of manners, including, for example, obtaining information from the memory device 124 and/or the database 134, among other sources. Such identification of the engine 102 can include collection of the model and/or serial number of the engine 102 that is to be inspected. The obtained information can also include information regarding the accessory gearbox 116 of the engine 102 and/or the number of blades 106 for one or more, if not all, stages of the engine 102.

Information regarding the gearbox 116 can include information identifying the gear ratio of the gearbox 116. Such information can provide an indication to the controller 114 as to how far the actuator 108 is to turn, and/or how long the actuator 108 is to be operated. For example, such information can indicate how far to move the actuator 108 to turn the shaft 104 so as to move from one blade 106 that is at an inspection positon, to having the next, sequential blade 106 moved to the inspection position. According to certain embodiments, such the operation of the actuator 108 can be aided by the inclusion of a rotator encoder that can provide an indication to the controller 114 of least the extent of the rotation of a drive shaft of the actuator 108. However, according to other embodiments, such operation of the actuator 108 can be in association with an open loop system. As discussed below, information obtained regarding the backlash in the gear train of the gearbox 116 can, according to certain embodiments, also be used by the controller 114 to determine the extent the actuator 108 is to be operated.

At block 208, the operator can position the camera 120 so that the camera 120 is positioned to capture a predetermined blade view of each blade 106 when the blade is at the desired position, which is referred to herein as the inspection position. The predetermined blade view can correspond to the view that is to be captured by the camera 120 of a blade 106 when that particular blade 106 is being inspected and/or cataloged. Further, the predetermined blade view can at least initially be determined by the operator, and can thus provide a captured view of the blade 106 at an operator selected angular position when the blade 106 is at the inspection position. Additionally, the predetermined blade view can capture a variety of different features, portions, and/or aspects of the blade 106, including for example, images of one or more of a root, tip, leading edge, trailing edge, front portion, and/or rear portion of the blade 106, or, alternatively, capture an image(s) of the entirety of the blade 106. Further, in at least certain instances, more than one blade 106 can appear in the captured image. Further, during the inspection and/or cataloging process, each blade 106 can be selectively, and sequentially, moved, such as, for example, using a rotational force provided by the actuator 108, so that the camera 120 can eventually capture an image of each blade 106 at the predetermined blade view.

According to certain embodiments, the positioning of the camera at block 208 can involve positioning a camera of a borescope at a relatively fixed position in the engine 102. Further, the camera 120 can generally remain at the set position as different blades 106 are moved to the inspection position. The operator can then proceed at block 210 to position an initial, or first, blade 106 at the inspection position at which the predetermined blade view of the blade 106 can be captured. Thus, such positioning can, for example, include the operator providing commands to the controller 114 to operate the actuator 108 so that the actuator 108 can be used in displacing the blade 106 the inspection position.

An image captured by the camera 120 of the blade 106 at the inspection position at block 212 can then be communicated to the controller 114. The controller 114 can then be used to record this operator-defined predetermined blade view as a template or a reference target. Such a template or reference target generated using information from the first blade 106 can be utilized to attain repeatability in the view, such that consistent information regarding various blades 106 can be captured by the camera 120. Such repeatability in the information that is collected for the different blades 106 via use of the vision system 118 can assist with not only ensuring consistent information or information type is received, but can also assist with analysis and/or training performed by the controller 114 and/or AI engine 132.

At block 214, the operator can manually determine blade numbering for the blades 106. Such indexing or numbering of the blades 106 can include assigning the blade 106 being currently viewed an identifier, including, for example, identifying the blade with a numerical, letter, and/or alphanumeric identifier, as well as a combination thereof, among other identifiers. For example, with respect to initial inspection of the blades 106, the first blade that is positioned at the inspection position can be assigned by the operator blade number "1", among other numbers or identifiers. In such an example, each sequential blade 106 can be assigned a higher number or identifier. Additionally, the identifier system may be utilized in connection with a preexisting identification format, wherein the identification format may include information in addition to the operator assigned identifier for each particular blade 106. For example, the identification format can provide information regarding the blade identifier that was assigned by the operator, date of installation of the blade, and/or the blade manufacturer, among other identification information.

Additionally, or alternatively, according to certain embodiments, prior to an initial inspection, the blades 106 may already be preassigned an identifier, or otherwise indexed, including, for example, by the manufacturer of the engine 102. In such a situation, at block 212 the operator can, for example, identify the particular blade 106 that is at the inspection position by using a preexisting identifier. Additionally, even if the blades 106 have preexisting identifiers, the operator can proceed with also assigning each of the blades 106 a different identifier, which may be cataloged or otherwise used to index the blades 106.

At block 216, information regarding the blade 106 that is at the inspection position can be cataloged. Moreover, information regarding the blade 106, including, for example, the identifier assigned to the blade 106 at block 212, can be inputted by the operator using the I/O device 128 and/or the operator control device 136, and be recorded, such as, for example, by the memory device 124 and/or the database 134, among other storage devices. Additionally, at block 216, the operator can input notes regarding the blade 106 using the I/O device 128 and/or the operator control device 136 that can also be stored by the memory device 124 and/or the database 134. Such notes can include, for example, information regarding observations of the blade 106 made by the operator, including, but not limited to, information regarding an observed physical condition of the blade 106, such as, for example, detected damage, wear, and/or visually detectable surface characteristics on/of the blade 106, among other information relating to the blade 106. For example, the operator can record an observation of one or more gouges in or on one or more edges and/or surfaces of the blade 106. As discussed below, according to certain embodiments, such information can be utilized in connection with alerting operators to be cognizant of such features and/or potential issues during subsequent inspections, and/or in connection the predictions, such as by the controller 114 and/or AI engine 132, relating to potential timing for replacement of the blade 106.

Such cataloging can also include recording at least one image of the blade 106 at the inspection position, as captured by the camera 120. Moreover, the image(s) of the blade 106 can be collected, such as, for example, by the memory device 124 and/or database 134, and/or processed, such as, for example, by the controller 114 and/or AI engine 132, to support at least certain recognition techniques that can be performed during subsequent inspections, as discussed below.

At block 218, a determination can be made by the controller 114 and/or the operator as to whether all blades 106 of the engine 102 that are to be cataloged have been cataloged. According to certain embodiments, such a determination can be made, at least in part, based on there being a difference between the identified number of blades 106 of the engine 102, as retrieved at block 206, and the number of blades 106 that have thus far been cataloged. Such a determination and also include determining whether all the blades 106 of a particular stage of the engine 102, such as, for example, a gas turbine engine, have or have not been cataloged, and/or whether the blades 106 of another stage of the engine 102 are to be cataloged.

If a determination is made at block 218 that at least another blade 106 still needs to be cataloged, then at step 220, the actuator 108 can be operated such that shaft 104 is rotated to an extent that positions the next, or other remaining, blade 106 at the inspection position such that the camera 120 can capture an image of that blade 106 at the predetermined blade view. Again, the extent of such operation of the actuator 108 and/or associated rotational displacement of the shaft 104 can utilize information obtained at block 206 that can provide an indication to the controller 114 as to how far the actuator 108 is to turn, and/or how long the actuator 108 is to be operated. Moreover, the information obtained at block 206 can be utilized by the controller 114 to operate the actuator 108 in a manner that moves another blade 106 to the inspection position so that the camera can obtain an image of that blade 106 at the predetermined blade view. As discussed below, according to certain embodiments, information obtained regarding backlash in the gear train of the gearbox 116 can also be used at block 206 in determining the extent the actuator 108 is to be operated.

Additionally, at block 222, using the template or a reference target recorded by the controller at block 212, the system 100 can determine if and/or when a blade 106 has reached the inspection position. Moreover, in response to receiving a command indicating that the actuator 108 is to be operated so as to rotate the next blade 106 to the inspection position, the controller 114 can operate the actuator 108 in a manner that facilitates displacement of the next blade 106 to move to the next blade 106 to the same position, or inspection position, at which the prior blade 106 was previously positioned. Attaining such repeatability in the positioning of the blades 106 can be attained in a variety of different manners. Generally, such analysis can, for example, involve the controller 114 comparing information from a captured image of the blade 106, at its current position, with corresponding information from the template or reference target that was attained from the captured image of the first blade 106. The extent such a comparison detects any differences in positional information, and/or if those differences exceed a predetermined threshold, can be evaluated by the controller 114 in determining whether, and to what extent, to operate the actuator 108 so as to adjust a position of the blade 106 that is to be inspected so as to move the blade to, or closer to, the position that the initial, or first, blade 106 was at when the image for the template or reference target was attained. If the position of the blade 106 to be inspected is to be moved, then following such displacement, another image of the repositioned blade 106 can be captured. The associated information from that captured image can then be compared with corresponding information from the template or reference target, and a determination can again be made as to whether to again reposition the blade 106, as discussed above. If the blade 106 is to not be repositioned, the captured image of the repositioned blade 106, which may correspond to an image taken at the predetermined blade view, can then be used for cataloging or indexing that blade 106, as discussed above.

Several different methods, and/or combinations of methods, can be utilized by the controller 114 and/or AI engine 132 in the comparison of the information from the captured image of the blade 106 that is to be inspected with the information provided by the template or reference target that was attained from the initial, or first, blade. Again, such an analysis can be utilized to determine whether the blade 106 that is to be inspected is, or is not, at the same location at which the predetermined blade view was attained of the initial, or first, blade, and if not, a corresponding error signal can be generated that can be indicative of an amount the actuator 108 is to be operated to move the blade 106 to the inspection position. While the below discusses some non-limiting approaches to determine whether the blade 106 that is to be inspected is, or is not, at the proper position, a variety of other approaches can be utilized, including, but not limited to, approaches that may utilized a properly trained AI engine 132.

For example, according to certain embodiments, edge detection and/or template matching methods can be used individually or in combination with each other. With edge detection, one or more images of the blade 106 that that has been moved to or around the inspection position, as captured by the camera 120, can be analyzed by the controller 114 and/or AI engine 132 to determine the location of the edges of the blade 106. The location of the determined edges could then be compared with the location of a reference edge(s), as determined using the template or reference target that was attained from the captured image of the first blade 106. Any such determined differences in edge locations, or any such differences that exceed a predetermined threshold, can then be used to determine the extent, if any, that the controller 114 is to operate the actuator 108 to reposition the blade 106 that is currently to be inspected.

Further, according to certain embodiments, the edge detection method employed by the controller 114 and/or AI engine 132 can be canny edge detection. Such edge detection can, for example, be utilized to detect the location of the leading edge, and moreover, can be utilized in connection with either confirming that the blade 106 to be inspected is, or is not, at the same position that the initial, first blade 106 was when the first blade 106 was at the inspection position and/or the extent the blade 106 that is to be inspected is to be repositioned to be at the inspection position.

With respect to template matching, a template obtained from the image captured of the first blade 106 can be superimposed over an image of the blade 106 that is currently being inspected to identify any differences in positioning. Again, to the extent such differences are determined, and/or such differences exceed a predetermined threshold, such differences can be used to determine the extent, if any, that the controller 114 is to operate the actuator 108 to reposition the blade 106 that is currently to be inspected.

Additionally, according to certain embodiments, the controller 114 and/or AI engine 132 can utilize a combination of edge detection and template matching to derive a calculated digital image correlation (DIC), including image correlation peaks. Such a correlation can utilize image registration techniques to obtain two dimensional and/or three dimensional measurements of differences between the information captured of the blade 106 that is to be inspected with the information provided by the template or reference target that was attained from the initial, or first, blade 106. According to certain embodiments, the correlation peak that is closest to an open-loop expected position value, which can correspond to a position the blade 106 being inspected is to reach, can be identified. To the extent there are differences, the position of the blade 106 that is to be inspected can be adjusted so that blade position is driven to that identified peak. Further, dynamic thresholds can be used to find local correlation maximums, which can correct for irregular peak heights such that identified peaks are not erroneously dismissed based on a relatively small size of the peak.

Another method that can be utilized by the controller 114 and/or AI engine 132 to determine whether the blade 106 that is to be inspected has been moved to, and/or is properly positioned at, the inspection position and/or the extent to adjust the position of the blade 106 to be at the inspection position is keypoint or feature matching. According to such a method, the positions or locations of one or more features of the blade 106 that is to be inspected, as provided from the captured image of the blade 106, is compared to the location of the similar feature(s) in the template or reference target that was obtained via the captured image of the initial, or first, blade 106. A variety of features and/or combination of features can be utilized, including, for example, a leading edge, trailing edge, root, and/or cooling hole of the blades 106, among other features. Again, discrepancies between the locations of such features for the blade 106 to be inspected and the information in the template or reference target corresponding to the initial, or first blade 106, can be used to determine the extent, if any, that the controller 114 is to operate the actuator 108 to reposition the blade 106 that is currently to be inspected. Moreover, such repositioning of the blade 106 to be inspected can be based on positioning such features of the blade 106 at the same location at which the similar features of the initial, or first, blade 106 were when the initial, or first, blade 106 was at the inspection location.

The manner in which the controller 114 operates the actuator 108 in connection with moving the blade 106 to the inspection position and/or adjusting the blade 106 in response to a determination that blade 106 is not at the inspection position and/or not at the same position as was the initial, or first, blade 106 when the predetermined blade view of the first blade 106 was captured can vary. For example, operation of the actuator 108 via the controller 114 can be performed using an on/off type control, including, but not limited to, a bang-bang controller. Additionally, or alternatively, proportional control can be utilized that can, for example, be driven by the error or differences determined in the position of the blade 106 that is to be inspected and the position at which the initial, or first, blade 106 was positioned when the initial, or first, blade 106 was at the inspection position and/or the position at which the predetermined blade view of the initial, or first, blade 106 was attained. Thus, for example, differences determined via use of the above-discussed edge detection, template matching, calculated digital image correlation, and/or keypoint or feature matching methods can be used in connection with the proportional control of the actuator 108.

Additionally, the commanded speed and/or power of the actuator 108 can also be controlled in a variety of manners. Again, such operation of the actuator 108 can be based on an error determination relating to the position of the blade 106 that is to be inspected and the initial, or first, blade 106, as discussed above. Such an error can be represented by an error signal in any number of input-to-output shapes between minimum and maximum output values, including, for example, linear, piecewise linear, and/or non-linear, as well as any combinations thereof. For example, according to certain embodiments, such control can include, a proportional-integral control or proportional-integral-derivative (PID) control, among others. The type of control may be based on the manner in which the error signal was generated. For example, an error signal based on a determination that used calculated image correlation peaks may utilized PID control as a manner of repositioning the blade 106 so that the blade position is driven to the identified peak.

With the blade 106 moved, via rotation of the shaft 104, so as to be at the inspection position, the process can return to block 212, at which an image of the blade 106 can be captured at the predetermined blade view. The operator can then, at block 214, assign the blade 106 that has been moved to the inspection position with the next, or sequentially higher, identifier, such, as for example, a number that is sequentially higher than the number used to catalog or index the prior blade 106 before cataloging or indexing the blade 106 at block 216. Thus, the process 200 can again repeat blocks 212-216 until all blades 106 have been cataloged. Once all blades 106 have been cataloged, the process 200 can proceed from block 218 to block 224, wherein the process 200 can at least temporarily be terminated.

Figure 3:
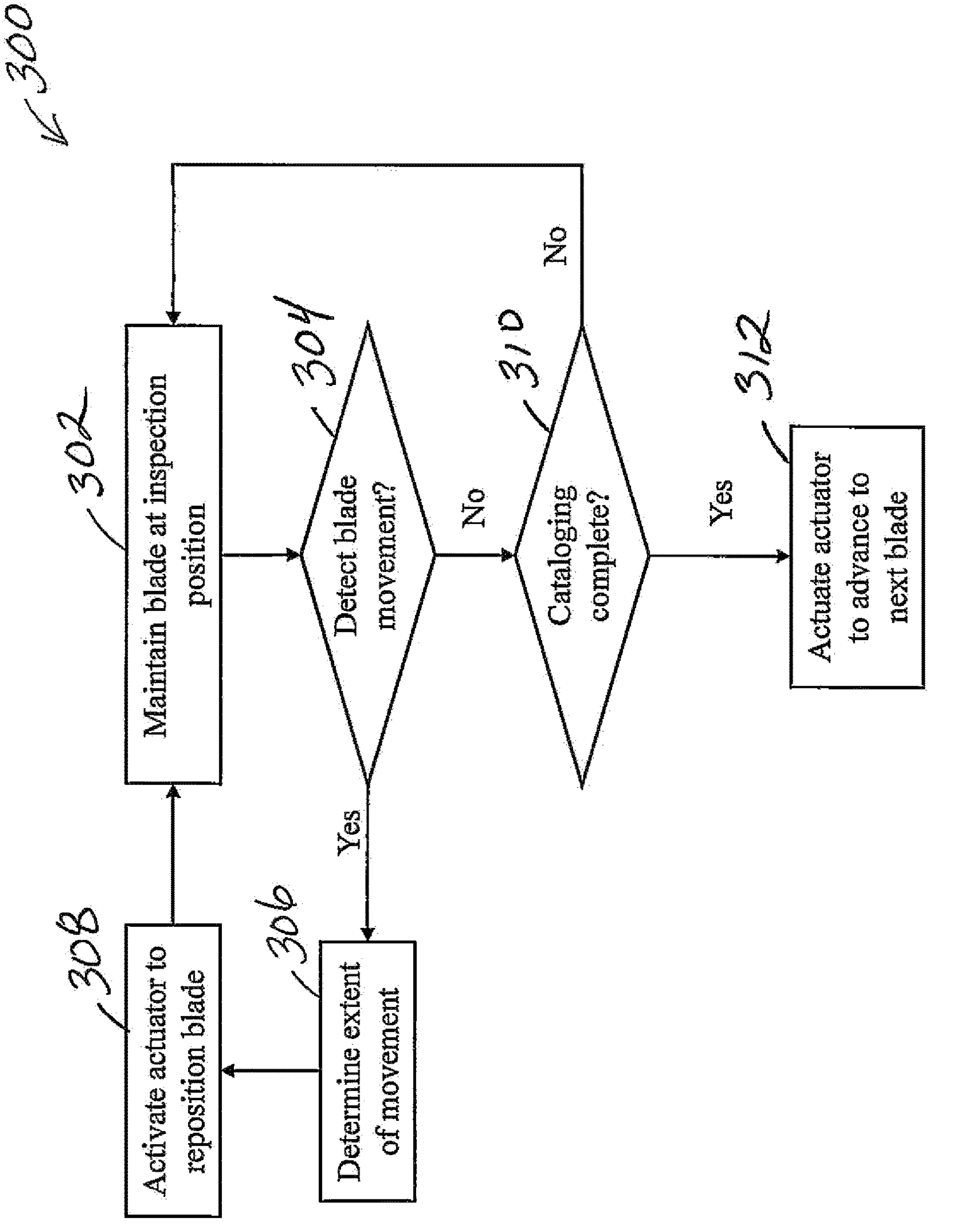
FIG. 3 illustrates a simplified flow chart of a method that can be performed using the positioning system shown in FIG. 1 for detecting movement of a blade that is to be held at the inspection position, and, if moved, returning the moved blade back to the inspection position.

FIG. 3 illustrates a simplified flow chart of a method 300 that can be performed using the positioning system 100 shown in FIG. 1 for detecting movement of a blade 106 that is to be held at the inspection position, and returning a moved blade 106 back to the inspection position. The method 300 corresponds to, or is otherwise associated with, performance of the blocks described below in the illustrative sequence of FIG. 3. It should be appreciated, however, that the method 300 can be performed in one or more sequences different from the illustrative sequence.

Referencing block 302, once the blade 106 is positioned at the inspection position and/or a positon that corresponds to the positon the initial, or first, blade 106 was at when an image of the initial, or first, blade 106 was captured at the predetermined blade view, as discussed above with respect to block 222, the positioning system 100 can utilize dynamic control to keep or maintain the blade 106 at that position. For example, according to certain embodiments, with the blade 106 at the inspection position, power may be removed from the actuator 108 so that the actuator 108, or an associated spindle, shaft, or other driver is not able to move. However, the blade 106 could possibly wander from that inspection position, such as, for example, in response to an external influence, including, but not limited to, a breeze or wind gust, and/or due to backlash in the in the gear train.

According to the illustrated embodiment, at block 304, in the event the blade 106 were to wander from the inspection position, such movement of the blade 106 can be visually detected, such as, for example, by the controller 114 and/or AI engine 132 receiving movement information that is/was captured by the camera 120. Detection of movement or wandering of the blade 106 away from the inspection position, as well as the determination of the extent or degree of such movement at block 306, can be achieved in a variety of different manners. For example, according to certain embodiments, such movement can be detected via vectorized image subtraction. Such an approach can utilize vector subtraction to detect differences in the current position of the blade 106, as determined from a captured image of the blade 106 at its current position, and the position at which the blade 106 was at when the blade 106 was at the inspection position and/or from information obtained from the template or reference target. Additionally, or alternatively, optical flow can also be utilized to determine the distance and/or extent to which the blade 106 has moved or wandered from the inspection position. Further, the trained AI engine 132, including supervised learning, can also be utilized to detect the movement, and/or the extent of movement, of the blade 106 from the inspection position In response to determining the extent of such movement of the blade 106 from the inspection position, at block 308 the controller 114 can generate a command to operate the actuator 108 in a manner, or to an extent, to which the blade 106 is returned to the inspection position. The controller 114 can control such operation of the actuator 108 in a variety of different manners so as to facilitate the return of the blade 106 to the inspection position, including, but not limited to, using the control methods and approaches discussed above with respect to block 222 of FIG. 2, including, but not limited to, on/off type control, proportional control, proportional-integral control, and/or PID control, among other control techniques.

With the blade 106 returned to the inspection position, the process 300 can return to block 302, where the position of blade 106 can continued to be maintained and monitored, and, if needed, readjusted until the cataloging process is determined to be completed at block 310. The completion of the cataloging process at block 310 can coincide with the completion of the cataloging at block 216 of FIG. 2. Then, similar, block 220 of FIG. 2, if other blades 106 are still to be cataloged and/or identified, at block 312 the actuator 108 can be actuated to position, as well as maintain the position of, the next blade 106 at the inspection position.

In view of the foregoing, the controller 114 can be configured to dynamically maintain blade position in the presence of disturbances. The controller 114 can be configured to dynamically assess blade position using any of the techniques described herein. When the blade 106 falls out of position, or is beyond its desired position by a threshold amount, the positioning system 100 can cause the actuator 108 to be activated and return the blade to the desired position. An exemplary process to maintain blade position is as follows:

a desired blade position is noted by the controller 114, either as a result of moving the blade 106 to a previously identified desired position, or as a result of an operator identifying current position as a desired position;

the controller 114 notes current position and compares it to the desired position using any of the techniques described herein; and if current position assessed by a current image is outside of a desired position (e.g. by comparing to a desired position image, to set forth just one non-limiting example), the positioning system 100 activates the actuator 108 to eliminate the error.

Figure 4:
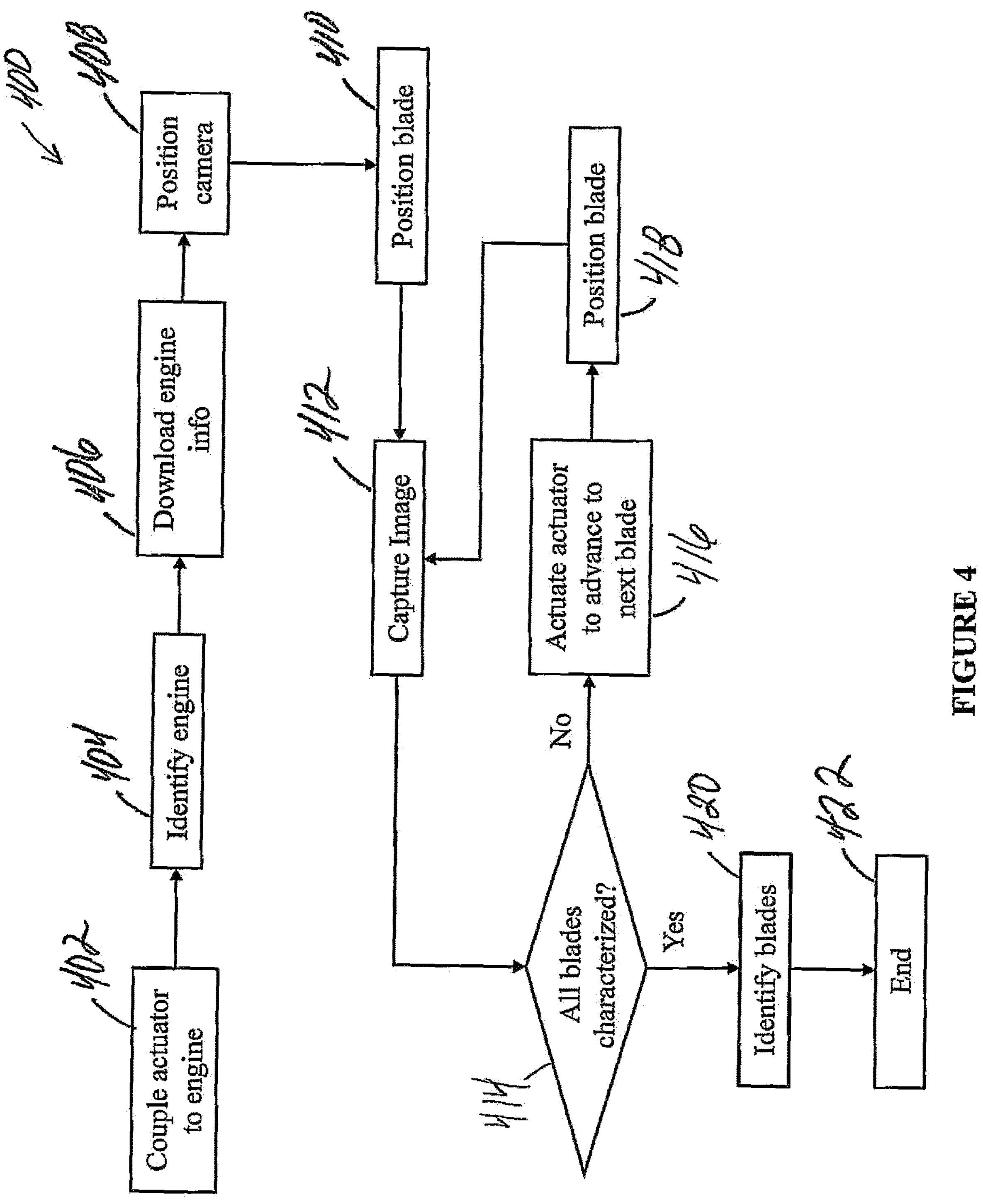
FIG. 4 illustrates a simplified flow chart of a method that can be performed using the positioning system shown in FIG. 1 for inspection of an engine after an initial inspection.

FIG. 4 illustrates a simplified flow chart of a method 400 that can be performed using the positioning system 100 shown in FIG. 1 for inspection of the engine 102 after an initial inspection has been performed. The method 400 corresponds to, or is otherwise associated with, performance of the blocks described below in the illustrative sequence of FIG. 4. It should be appreciated, however, that the method 400 can be performed in one or more sequences different from the illustrative sequence.

The process of coupling the actuator 108 to the engine 102 at block 402, identifying the engine 102 at block 404, downloading information regarding the engine 102 at block 406, and positioning the camera 120 at block 408 can at least be generally similar to blocks 202, 204, 206, and 208, respectively, as previously discussed with respect to the method 200 depicted in FIG. 2.

However, with respect to positioning the camera at block 408, the operator may at least attempt to position the camera 120 at the same position and/or orientation that the camera 120 had when previously capturing images of blades 106, including at the predetermined blade view, during prior inspections and/or blade identification procedures. The ability to generally replicate the predetermined blade view from the initial inspection and/or other subsequent inspections can improve the ability and/or accuracy of the controller 114 and/or neural network 132 in at least determining whether the position of a particular blade 106 that is undergoing inspection is, or is not, to be adjusted and/or with the proper identification of the blade 106. Moreover, such similarities in views can assist in the efficiency and/or accuracy of the determination of whether the blade 106 is, or is not, at the inspection position, among other determinations and/or detections made via the controller 114 and/or neural network 132 from images captured by the camera 120. Positioning the camera 120 during subsequent inspections so as to at least again capture the same predetermined blade view as was used during at least the initial inspection can be attained in variety of different manners. For example, using a display of an I/O device 128, an operator may compare an image of a blade 106 that is currently being captured by the camera 120 with the previously attained template or reference target, among other templates, outlines, and/or ghost views that may be shown in a display of the I/O device 128. Using such a displayed comparison, the operator can adjust the position/orientation of the camera 120 relative to a blade 106 so as to at least attempt to replicate the position/orientation the camera 120 was previously at when capturing images at the predetermined blade view. Additionally, or alternatively, the neural network 132 can be utilized to at least assist in correlating an image that is being currently captured by the camera 120 during the current inspection to prior captured images and/or data that may have been acquired during a prior inspection(s), thereby at least potentially alleviating the necessity to try to position the camera 120 at the same position/orientation that the camera 120 was previously at when previously capturing images at the predetermined blade view. Alternatively, the AI engine 132 can be utilized to assist in guiding the camera 120 to position that may correspond to the position at which the predetermined blade views were previously captured.

At block 410, the controller 114 can operate the actuator 108 to rotation the shaft 104 such that a blade 106 is moved to the inspection position. Such positioning can again incorporate one or more of the approaches discussed above with respect to block 222 in connection with determining whether the blade 106 is at the inspection position, as well as the extent an adjustment in the position of the blade 106 may be needed to reach the inspection position. Thus, block 410 can include, for example, application of the above-discussed edge detection, template matching, calculated digital image correlation, and/or keypoint or feature matching methods, as well as the associated control approaches discussed above, such as on/off, proportional, proportional-integral, and/or PID types of control, among others. Thus, at block 410, the controller 114 can seek to position the blade 106 at a position that is the same as, or comparable to, the position at which the blade 106 was when prior information regarding the blade 106 was captured by the camera 120 so as to improve the accuracy of comparisons between current and past captured images of the blade 106 and/or between the associated information derived from those images.

At block 412, with the blade 106 at the inspection position, an image(s) of the blade 106 can be captured. The controller 114 and/or AI engine 132 can then at block 414 utilize the image to characterize the blade 106. Such characterization can include processing information from the captured image of the blade 106 to identify information regarding intentional and/or unintentional characteristics of the blade 106 that is to be inspected. For example, according to certain embodiments, such characterization can involve identifying the presence, shape, size, and/or location of intentional design characteristics of the blade 106 that is at the inspection position, including, for example, one or more, or a combination, if not all, of the leading edge, cooling hole(s), trailing edge, outline, curvatures, bends, and/or overall shape, among other characteristics, of the blade 106. Additionally, or alternatively, such characterization can involve identifying unintentional characteristics, including, for example, wear and/or damage characteristics of the blade 106 that is at the inspection position, including, but not limited to, gouges and/or bent areas, among other types of damage and wear. Such an characterization of the blade 106 via detected intentional and/or unintentional characteristics can be attained in a variety of manners, including, for example, via analysis of one or more captured images of the blade 106 by the controller 114 and/or the AI engine 132, including, for example, by the AI engine 132 applying one or more of Oriented Fast and BRIEF (ORB) algorithms and/or Hu Moments, among other algorithms and models.

One or more of the identified intentional and/or unintentional characteristics of the blade 106 can be used to provide one or more classifiers for the blade 106. Such classifiers can be used as portions or features of the blade 106 that are to be compared with data stored in the memory device 124 or database 134, among other internal or external storage locations, regarding a collection of blades 106 so as to identify the blade 106 that is at the inspection position. Thus, the classifiers may be predetermined and/or may be specific to a blade 106. For example, a preexisting classifier could relate to the particular shape and/or relative positions of one or more intentional characteristics of the blade 106, such as, for example, a size or shape of the leading edge and/or cooling hole(s) and/or a position of a cooling hole(s) relative to the leading edge, among other intentional characteristics of the blade 106. Additionally, or alternatively, a classifier can include a size, location and/or relative position of unintentional features, such as, for example, a gouge, among other wear features, on the blade 106 that is at the inspection position.

Stored or collected data or information for a plurality of blades 106 can be analyzed for similar classifiers so as to identify, at block 420, the blade 106 having classifiers that are determined to be most similar to that/those identified for the blade 106 that is at the inspection position. As seen in FIG. 4, according to certain embodiments, such identification of the blades 106 can occur when a determination is made that no other blades 106 are remaining to be characterized. However, according to other embodiments, such identification at block 420 can occur in connection with characterization of a particular blade 106, and/or after a predetermined number of blades 106 have been characterized. Identification of the blade 106 using such stored or collected data or information for a plurality of blades 106 based on the similarities between one or more classifiers can be determined by the controller 114 and/or the AI engine 132. For example, the AI engine 132 can determine such similarities in classifiers using Random Forest and/or Multiple Perceptron Classifier algorithms and/or models, among techniques or approaches.

Additionally, or alternatively, classifiers can be used in connection with a segmentation network technique. Using the segmentation network technique, individual blades 106 can, for example, at block 414, be segmented out from the plurality of blades 106 so as to acquire images of the surfaces of the blades 106. The captured images of the surfaces of the blades 106 can then be used to identify classifiers, which can then be used in connection with identifying, at block 420, the blades 106 using the data stored for the blades 106, as discussed above.

According to another embodiment, an embedding network approach can be utilized in which the AI engine 132 is be trained to identify the classifiers and/or the comparison of the identified classifiers using the data stored for the blades 106 in manners that are generally similar to those discussed above. According to such a process, one or more images of a blade 106 can be captured and cropped, for example at block 414, so as to provide relevant information and/or information regarding a particular segment or area of the blade 106. Moreover, such cropping can remove noise and/or extraneous information from the captured image(s) that may not be useful in the identification of intentional and/or unintentional characteristics and/or the associated classifiers of the blade 106. The AI engine 132 can be configured to then determine and/or select which classifiers or other characteristics provided by the cropped images are to be used in connection with the comparison, at block 420, with the data stored for the various blades 106. According to certain embodiments, the AI engine 132 can store such selected information in the memory device 124 or database 134, among other internal or external storage locations. For example, according to certain embodiments, such information can be stored as vector representations in a database such as Pinecone and FeatureHub.

Various techniques can be utilized by the AI engine 132 at block 420 to perform comparisons between the vector representations obtained from images captured from the blade 106 with vector representations from the images and/or data stored in the database for a collection of blades 106, including, for example, a k-nearest neighbor (k-NN) analysis and/or thresholding, among other techniques. For example, a k-NN analysis can be used to identify, based in proximity in the vector space, one or more blades 106, or blade candidates, having the most similar features. Such blade candidates can then be evaluated to identify which, if any, of the blade candidates satisfy a threshold, such as, for example, in terms of closeness or proximity of the blade candidate to a target that is associated with the blade 106 that is to be identified. If multiple blade candidates fall within the threshold, then context information can be utilized, such as, for example, prior knowledge from previous inspections of the sequential order or arrangement of the plurality of blades 106. For example, stored knowledge of the order or relative positions of the blades 106, and an identification of the blades 106 that are around the blade 106 that is currently to be identified, can assist in identifying, at block 420, the correct blade candidate from the multiple blade candidates, which can thereby allow for identification of the blade 106 that is currently at the inspection position.

As mentioned above, at block 414 a determination can be made, for example by the controller 114 and/or operator, as to whether another blade(s) 106 is/are still to be characterized, or if the blades 106 of another stage of the engine 102 are still to be characterized. If at least another blade 106 of the engine 102 and/or the current stage of the engine 102 is still to be characterized then, at block 416, the controller 114 can issue a command to activate the actuator 108 so as to advance another blade 106 to the inspection position, and at block 418 a determination can be made as to whether the advanced blade 106 has reached the inspection position. Thus, blocks 416 and 418 can involve processes and techniques that are similar to those discussed above with respect to at least blocks 220 and 222 of FIG. 2. If however the determination is made at blocks 414 and 420 that all blades 106 of the engine 102 and/or current stage of the engine 102 have been characterized and identified, respectively, then the process 400 can at least temporarily terminate at block 422.

Figure 5:
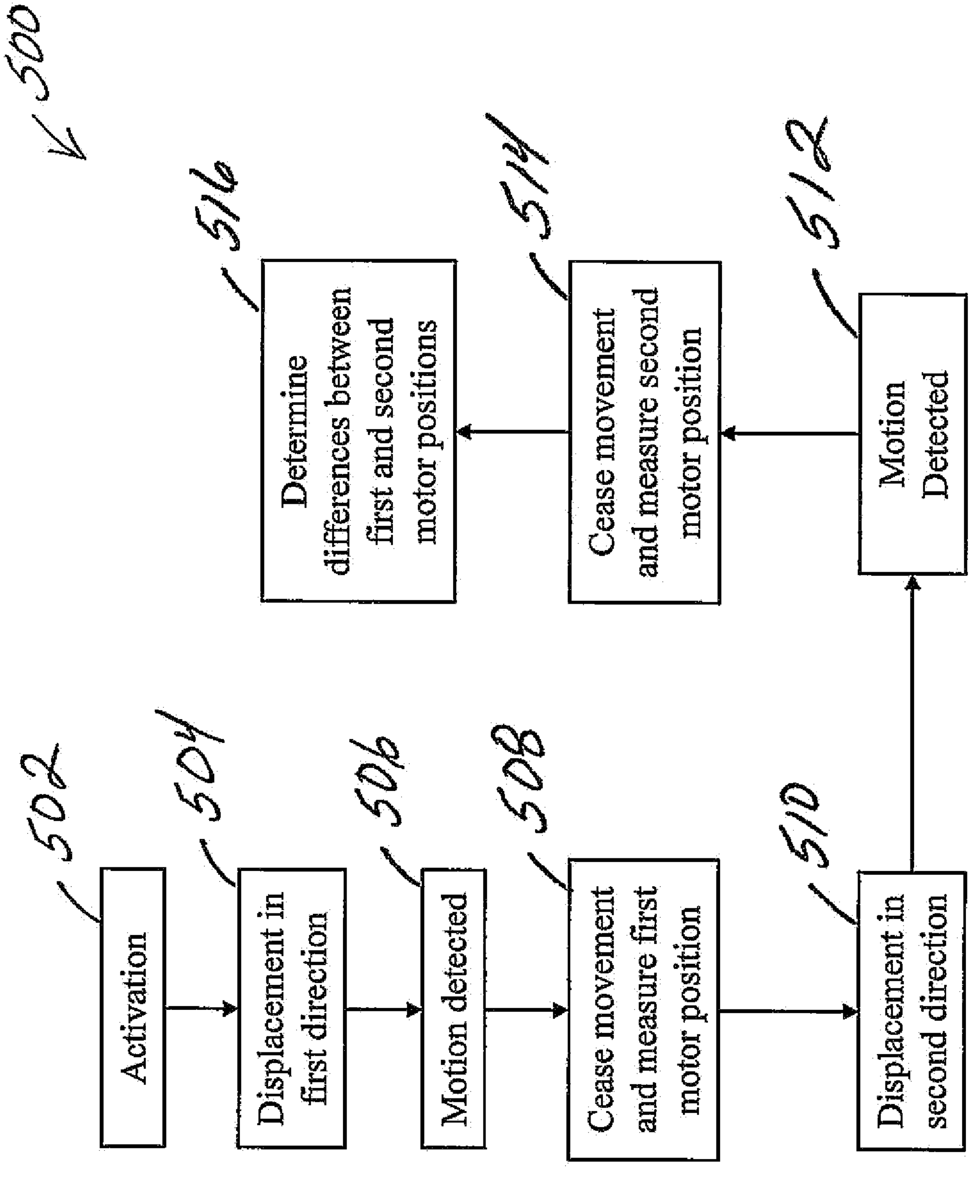
FIG. 5 illustrates a simplified flow chart of a method that can be performed using the positioning system shown in FIG. 1 to determine backlash in a gear train of, or coupled to, the engine.

FIG. 5 illustrates a simplified flow chart of a method 500 that can be performed using the positioning system 100 shown in FIG. 1 to determine backlash in a gear train of, or coupled to, the engine 102, including, for example, the gear train pf the gearbox 116. The method 500 corresponds to, or is otherwise associated with, performance of the blocks described below in the illustrative sequence of FIG. 5. It should be appreciated, however, that the method 500 can be performed in one or more sequences different from the illustrative sequence.

The positioning system 100 can utilize the vision system 118 to determine backlash. Knowledge of backlash can assist the controller 114 and/or AI engine 132 in accurately determining the extent the actuator 108 is to be actuated to position a blade 106 at the inspection position. Further, knowledge of backlash can assist the controller 114 and/or AI engine 132 in determining how much or long to actuate the actuator 108 quickly when reversing directions to minimize delays in a commanded movement, which can thereby optimize movement of the actuator 108, blade shaft 104, and blades 106.

The backlash determination can be determined at any time, as well as repeated at different times to detect possible changes in the backlash. Further, according to certain embodiments, the method 500 can be performed before the initial inspection and/or cataloging of the blades 106 of an engine 102, as discussed above with respect to FIG. 2, and/or prior to subsequent blade identification procedures, including prior to those discussed above with respect to FIG. 4.

According to the illustrated embodiment, at block 502, with the positioning system 100 coupled to the engine 102, the operator can issue a command, such as, for example, via use of the operator control device 136 and/or the I/O device 128, to indicate to the controller 114 and/or AI engine 132 that the system 100 can relatively safely proceed with conducting the backlash determination. The controller 114 can then, at block 504, initiate rotational movement of the engine 102, including, with respect to rotation of the gear train and shaft 104, in a first direction. Such movement can continue until, at block 506, movement of one or more of the blades 106 is detected by the system 100, and moreover, by the controller 114 and/or AI engine 132, from information captured by the vision system 118. A variety of different types of techniques can be utilized by the controller 114 and/or AI engine 132 in connection with detection of movement from the information captured by the vision system 118. For example, vectorized image subtraction can be utilized in which a change or difference between information captured in images exceeds a threshold, which can provide an indication of movement of the blade 106. Additionally, or alternatively, optical flow, among other techniques, can be utilized where key points on a blade 106, including, for example, a geometric feature of the blade 106 (e.g. leading edge, cooling hole, etc.) or a wear feature, such as, for example, a gouge, is monitored or followed by the controller 114 and/or AI engine 132 for detection of movement.

Upon detection of movement, at block 508 operation of the actuator 108 can be stopped so that movement of the blade(s) 106 ceases. With movement stopped, a current position of the actuator 108 can be detected, such as, for example, via use of an encoder of the actuator 108. The measured position of the actuator 108 can also be recorded, such as, for example, by the memory device 124.

At block 510, the controller 114 can initiate movement in the engine 102, including in the gear train and shaft 104 in a second direction, the second direction being opposite of the first direction mentioned above with respect to block 504. Such movement in the second direction can continue until movement of one or more of the blades 106 is detected by the controller 114 and/or the AI engine 132 at block 512. Such detection of movement at block 512 can occur in one or more manners similar to those discussed above with respect to block 506.

In response to detection of movement at block 512, at block 514 operation of the actuator 108 can be stopped such that movement of the blade(s) 106 ceases. With movement stopped, the current position of the actuator 108, as provided, for example, via the encoder, can be measured and, optionally, stored, such as for example, by the memory device 124. At block 516, the differences between the measured positions of the actuator 108, as recorded at blocks 508 and 514, can be determined, with the difference providing the backlash of the gear train of the gearbox 116. The determined backlash can then be recorded, such as, for example, in the memory device 124, so as to provide backlash information that can be utilized in connection with determining how much and/or long to actuate the actuator 108 when moving a blade 106 to the inspection position.

In view of the foregoing, according to certain embodiments, nonlinearities in the gear train like gear lash at a location between actuator 108 and the shaft 104 can be incorporated into the control scheme. For example, if the controller 114 needs to reverse a direction of the shaft 104, the actuator 108 can be run at a relatively high rate as the gear lash is taken out. An exemplary process to characterize the gear lash is as follows:

an operator initiates the process to characterize gear lash;

the positioning system 100 operates the actuator 108 until movement is detected (either detected by the operator or by the positioning system 100 through analysis of images which may use any of the approaches above);

the actuator 108 movement is halted by the positioning system 100 to bring the blade 106 to a halt;

the positioning system 100 notes the image associated with the starting blade position for gear lash determination;

the system actuates the actuator 108 in a reverse direction and monitors blade movement;

movement of the actuator 108 is recorded by the positioning system 100 during the reversal and until new movement is detected in the blade 106;

when new blade movement is detected by the positioning system 100 from the reversed actuation, total travel of the actuator 108 is noted;

a gear lash parameter is set at the total travel of the actuator 108 recorded by the positioning system 100; and possible adjustments are made to the gear lash parameter, including reducing the gear lash parameter by a set amount (either set fixed amount or set relative amount).

When the gear lash parameter is set the actuator 108 can be operated at a maximum rate (or any other desired rate) when needed to reverse the direction of travel of the shaft 104. The positioning system 100 can provide an indication to an operator that it is operating the system to remove gear lash. Such indication can include visual and/or aural techniques. To provide one non-limiting example of the use of the gear lash characterizer, an operator using manual mode may wish to move to a blade position in a reverse direction from that which the operator had been moving the shaft 104. In this case the operator can activate a gear lash removal routine (e.g. through selection of a button) and the positioning system 100 can quickly remove the lash. In some forms the positioning system 100 may lock out further action by the operator until the lash is removed, but in others the positioning system 100 may be configured to halt the gear lash removal during its execution.

Information regarding gear lash can be used in combination with any of the control techniques described herein to dynamically maintain blade position. To set forth just one non-limiting example, if gear lash has been characterized and a gear lash parameter set, the controller 114 can be configured to issue a command to the actuator 108 to quickly remove gear lash as an open loop command to the actuator 108 prior to switching to closed loop control based on a current image.

Additionally, or alternatively, the positioning system 100 can also be configured to match current images of a particular blade 106 with past images of the blade 106 to permit time based analysis of the blades 106. The positioning system 100 can either rely upon the controller 114 to compare present images against past images, or rely upon an offline system to compare current with past images of a blade 106. Such an approach includes identifying (with the controller 114 or an offline system) a blade 106 and matching a current image of the blade 106 with a previous image.

The process of matching blade images between current and past images can be accomplished using image analysis and/or knowledge of the order of blades 106. The process by which images from a current inspection can be matched to prior inspections can be accomplished using the image as a whole, one or more parts of the images, a composite of images in different wavelengths, etc. Features such as shape, coloration, defects, scuffs, scratches, holes, pitting can be used to aid in comparing the images from a current set of images to prior set of images. Additionally and/or alternatively, if the blades 106 were rotated through a complete revolution of the shaft 104 and images taken of each blade 106, the revolution of images can be compared with a prior revolution of images (with the comparison taking a variety of forms including comparison techniques noted above). The revolution of either current or past images can be rotated through keeping the other of the current or past images stationary. A score, or plurality of scores, can be provided of a comparison of those images at any given rotation of the set of images. The comparison of images at any given point in the rotation can be deemed to be done at an image rotation position.

In the embodiment in which a single score is provided, the comparison score can be set at a maximum score of any of the individual blade comparisons at that particular rotation position, or it can be set as an aggregate score of all comparisons at the particular revolution position, or set at an average score of comparisons at the revolution position, to set forth just a few non-limiting examples. The revolution position having the highest comparison score can be set as the suggested revolution position. An operator can accept the suggested revolution position as part of a comparison process, or the system can proceed without confirmation.

In embodiments in which a plurality of scores can be provided, a matrix can be used to track scores and multidimensional analyses performed. To set forth just one non-limiting example, a principal component analysis could be used as one step in a process to aid in the determination of the rotation position that results in a comparison of current and past images of individual blades 106.

For situations in which a blade 106 may have been replaced on the shaft 104 and a revolution of images will include an image in a current data set that does not correspond to an image of a previous dataset (owing to the replacement of the blade), accommodation can be made to account for such a blade 106. Such accommodation can include any of the techniques described above to identify an outlier.

In an additional and/or alternative embodiment, the positioning system 100 can also be configured to determine when a complete revolution of the shaft 104 has occurred and thereafter flag such a determination to an operator and/or halt further rotation of the shaft 104 by the actuator 108. Such a scheme can be accomplished by a current image in an inspection against prior collected images in the same inspection. The positioning system 100 can compare images using techniques described above, and when a comparison yields a score or plurality of scores above a threshold the system can flag such a determination and/or halt further rotation. In an additional form the positioning system 100 can continue rotating through blades 106, and if a sufficient succession of blades 106 continues to score above a threshold then the flag can be set and/or the rotation of the shaft 104 halted. Such successive positive determinations can be used in lieu of a single positive determination to eliminate the possibility of a false positive that a complete revolution of the shaft 104 has occurred.

As will be apparent from the discussion above, and for the avoidance of doubt, any of the various embodiments can be combined with others. For example, the AI engine 132 based controller 114 trained on a dataset of blade images can be used with any of the other controller 114 embodiments, including but not limited to the gear lash eliminating control scheme. As will be appreciated, the various embodiments are not inherently exclusionary of the others and thus are welcoming to working in concert with each other.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method for identifying a plurality of blades of an engine, the method comprising:

(a) recording a reference view captured by a vision system of a first blade of the plurality of blades at a first blade position;

(b) controlling, by a controller, an operation of an actuator to displace the first blade from the first blade position;

(c) comparing, by a controller after displacement of the first blade from the first blade position, information from a view captured by the vision system of another blade of the plurality of blades to information from the reference view;

(d) determining, from the compared information, if the other blade is at the first blade position;

(e) generating, by the controller if the other blade is determined to not be at the first blade position, an error signal indicative of an amount the actuator is to be operated to displace the other blade to the first blade position; and (f) determining, by the controller and using image information captured by the vision system during operation of the actuator in both a first rotational direction and a second rotational direction, a value indicative of mechanical backlash between the actuator and the engine, and automatically adapting the error signal or the actuator control based on the determined backlash value.

2. The method of claim 1, further comprising; (g) controlling, by the controller using the error signal, an operation of the actuator to displace the other blade to the first blade position.

3. The method of claim 2, wherein the controlling of the operation of the actuator using the error signal comprises controlling at least one of a power and a speed of the actuator using at least one of a proportional-integral control and a proportional-integral-derivative control.

4. The method of claim 2, wherein the error signal is part of a closed loop system between at least the vision system and the controller, and wherein the controlling of the operation of the actuator comprises one or more an on/off control and a proportional control.

5. The method of claim 1, further comprising: (f) recording, by the controller, an input of a blade identifier for each blade that is determined to be at the first blade position.

6. The method of claim 5, further comprising: (f) repeating steps (c)-(f) for each blade of the plurality of blades.

7. The method of claim 1, wherein comparing information from the view captured of the other blade to information from the reference view comprises the controller employing one or more of the following techniques: edge detection, template matching, keypoint feature matching, image template matching, and canny edge detection.

8. The method of claim 1, further comprising:

(g) detecting, by the controller using information captured by the vision system when the other blade is at the first blade position, a movement of the other blade;

(h) determining, if the movement of the other blade is detected, an amount of the movement of the other blade; and (i) controlling, by the controller, a command to operate the actuator to displace the other blade back to the first blade position, the command being based at least in part on the amount of the movement determined by the controller.

9. A method for identifying a plurality of blades of an engine, the method comprising:

(a) recording a reference view captured by a vision system of a first blade of the plurality of blades at a first blade position;

(b) comparing, by a controller after displacement of the first blade from the first blade position, information from a view captured by the vision system of another blade of the plurality of blades to information from the reference view;

(c) determining, from the compared information, if the other blade is at the first blade position; and (d) generating, by the controller if the other blade is determined to not be at the first blade position, an error signal indicative of an amount an actuator is to be operated to displace the other blade to the first blade position, (f) detecting, by the controller using information captured by the vision system when the other blade is at the first blade position, a movement of the other blade;

(g) determining, if the movement of the other blade is detected, an amount of the movement of the other blade; and (h) controlling, by the controller, a command to operate the actuator to displace the other blade back to the first blade position, the command being based at least in part on the amount of the movement determined by the controller, wherein the detection of the movement of the other blade utilizes vector image subtraction.

10. The method of claim 9, wherein the amount of the movement is determined at least in part using optical flow.

11. The method of claim 10, wherein the determination of the amount of the movement of the other blade comprises:

storing information regarding movement of at least some blades of the plurality of blades of the engine and/or at least some blades of a plurality of blades of at least another engine;

performing machine learning using the stored information to recognize movement of the other blade; and determining the amount of movement of the other blade in accordance with the recognized movement.

12. The method of claim 1, wherein at least the determination of whether the other blade is at the first blade position comprises:

performing machine learning using stored information of at least some blades of the plurality of blades of the engine and/or at least some blades of a plurality of blades of at least another engine being at the first blade position to recognize when the other blade being at the first blade position.

13. The method of claim 1, further comprising:

(g) determining a backlash value, the determination comprising:

(i) generating, by the controller, a first signal to operate the actuator to rotate at least a shaft of the engine in a first direction, the plurality of blades being coupled to the shaft;

(ii) detecting, by the controller using information from the vision system while the shaft is being rotated in the first direction, a first movement of at least one blade of the plurality of blades;

(iii) generating a first command, by the controller in response to the detection of the first movement, to cease operation of the actuator;

(iv) recording a first position of the actuator, the first position corresponding to a position at which the actuator stopped in response to the first command;

(v) generating, by the controller, a second signal to operate the actuator to rotate at least the shaft of the engine in a second direction, the second direction being opposite of the first direction;

(vi) detecting, by the controller using information from the vision system while the shaft is being rotated in the second direction, a second movement of at least one blade of the plurality of blades;

(vii) generating a second command, by the controller in response to the detection of the second movement, to cease operation of the actuator;

(viii) recording a second position of the actuator, the second position corresponding to a position at which the actuator stopped in response to the second command;

(ix) determining, using a difference between the second position and the first position, the backlash value; and (h) controlling, by the controller using the error signal and the backlash value, an operation of the actuator to displace the other blade to the first blade position.

14. The method of claim 13, wherein the detection of the first and second movements are determined using one or more of vectorized image subtraction, optical flow, and/or a neural network of the controller.

15. A method for identifying a plurality of blades of an engine, the method comprising:

(a) generating, by a controller, a command to rotate, via an operation of an actuator, a shaft of the engine to position a blade of the plurality of blades at a blade position that corresponds to a reference position at which a reference blade image had previously been captured;

(b) identifying, by the controller using one or more images captured by a vision system, at least one classifier of the blade, the at least one classifier corresponding to one or more intentional and/or unintentional physical features of the blade that is/are detected by the controller from the one or more images;

(c) comparing the at least one classifier with stored data for the plurality of blades; and (d) identifying, from an outcome of the comparison, a stored identifier for the blade; and (e) repeating steps (a)-(d) until each blade of the plurality of blades is identified; and (f) determining, by the controller and using image information captured by the vision system during operation of the actuator in both a first rotational direction and a second rotational direction, a value indicative of mechanical backlash between the actuator and the engine, and automatically adapting the error signal or the actuator control based on the determined backlash value.

16. The method of claim 15, further including the step of determining, by the controller, a camera of the vision system is at a position that corresponds to a previous position at which the camera had been positioned when the reference blade image was captured.

17. The method of claim 15, further including determining, by the controller, if the blade is at the reference blade position; and generating, by the controller if the blade is determined to not be at the reference blade position, an error signal indicative of an amount an actuator is to be operated to displace the blade to the reference blade position.

18. The method of claim 15, wherein determination of the at least one classifier comprises:

storing information regarding a classifier of at least some blades of the plurality of blades of the engine and/or at least some blades of a plurality of blades of at least another engine; and performing machine learning using the stored information to determine the at least one classifier of the other blade.

19. The method of claim 15, wherein the determination of the value indicative of mechanical backlash further comprises:

(i) generating, by the controller, a first signal to operate the actuator to rotate at least the shaft of the engine in the first rotational direction;

(ii) detecting, by the controller using information from the vision system while the shaft is being rotated in the first rotational direction, a first movement of at least one blade of the plurality of blades;

(iii) generating a first command, by the controller in response to the detection of the first movement, to cease operation of the actuator;

(iv) recording a first position of the actuator, the first position corresponding to a position at which the actuator stopped in response to the first command;

(v) generating, by the controller, a second signal to operate the actuator to rotate at least the shaft of the engine in the second rotational direction, the second rotational direction being opposite of the first rotational direction;

(vi) detecting, by the controller using information from the vision system while the shaft is being rotated in the second rotational direction, a second movement of at least one blade of the plurality of blades;

(vii) generating a second command, by the controller in response to the detection of the second movement, to cease operation of the actuator;

(viii) recording a second position of the actuator, the second position corresponding to a position at which the actuator stopped in response to the second command; and (ix) determining, using a difference between the second position and the first position, the value indicative of mechanical backlash.

* * * * *